Nov. 8, 1955  A. L. PETERSON  2,723,332
ELECTRODE HOLDER
Filed Jan. 5, 1952
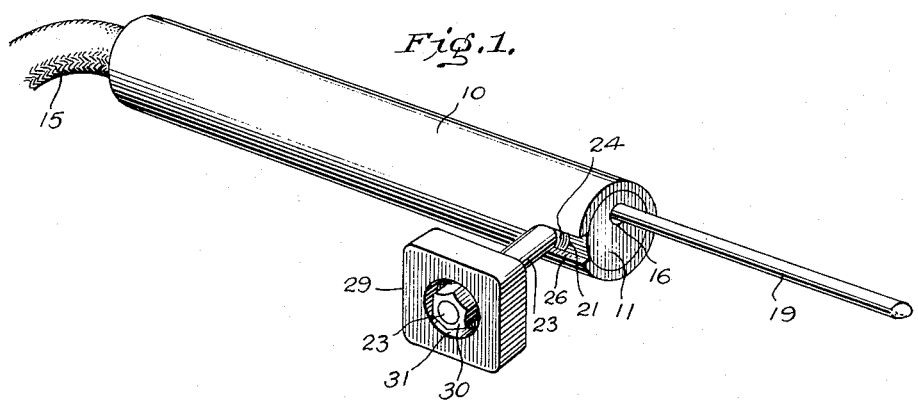
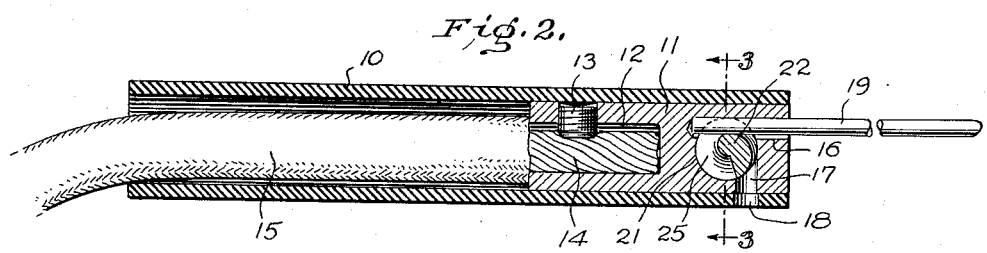
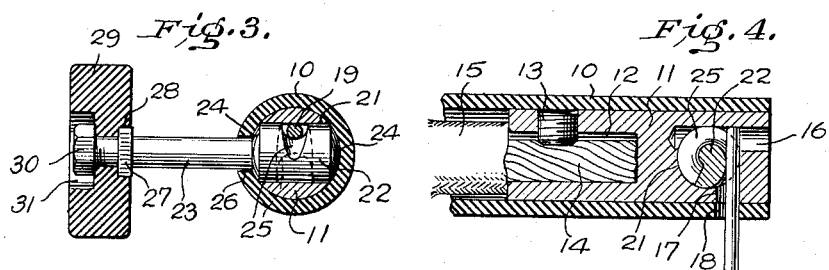
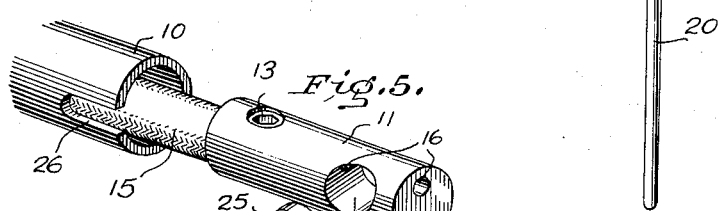
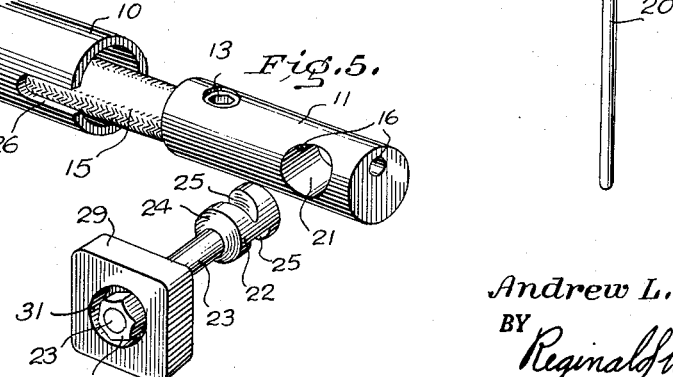
INVENTOR.
Andrew L. Peterson
BY
Reginald W. Hoagland
ATTORNEY

United States Patent Office 2,723,332
Patented Nov. 8, 1955

2,723,332

ELECTRODE HOLDER

Andrew L. Peterson, Flint, Mich.

Application January 5, 1952, Serial No. 265,071

4 Claims. (Cl. 219—8)

The present invention relates to electrode holders used in arc welding and aims to provide a novel and improved device of this character for quickly and conveniently engaging and disengaging the electrode and for securely supporting the electrode while in use.

Another object of the invention is to provide an electrode holder having a minimum number of parts constructed and arranged relative to one another and relative to an electrode supported thereby for holding said parts attached together while in use.

Another object of the invention is to provide an electrode holder of few parts as above-indicated wherein said holder is insulated against accidental arcing should the same be inadvertently laid down with the current on.

Another object of the invention is the provision in an electrode holder of stationary electrode gripping surfaces for holding the electrode at different angles relative to the holder and a single movable electrode gripping element for engaging and clamping the electrode against any one of the different stationary gripping surfaces.

A further object of the invention is the provision in an electrode holder of a rugged manually actuating gripping jaw which may be positively rotated in either direction to clamp or unclamp the electrode between same and a stationary gripping surface.

A still further object of the invention is to provide an electrode holder as set forth in the preceding objects wherein the rotation of the actuated gripping jaw is in a direction to hold electrodes against stops in the holder during clamping and in a direction to partially feed electrodes out of the holder when unclamping.

It is also an object of the invention to provide an electrode holder of the above-indicated character which is extremely simple and substantial in construction, economical to manufacture, and thoroughly efficient and practical in use.

These, together with various auxiliary features and objects of the invention which will later become apparent as the following description proceeds, are attained by the present invention, a preferred embodiment of which has been illustrated, by way of example only, in the accompanying drawings, wherein:

Figure 1 is a perspective view of the improved electrode holder with an electrode supported in alignment with the handle thereof;

Figure 2 is a longitudinal section through same;

Figure 3 is a cross section taken on line 3—3 of Figure 2;

Figure 4 is a fragmentary longitudinal section similar to Figure 2 showing an electrode supported at ninety degrees to the handle; and Figure 5 is a perspective view similar to Figure 1 with parts separated and a portion of the handle broken away.

Referring now more specifically to the accompanying drawings wherein like numerals designate similar parts throughout the various views, the numeral 10 indicates a cylindrical handle constructed of tubular insulating material which is adapted to receive in one end thereof a terminal block 11 provided with a cylindrical outer surface that frictionally engages the inner cylindrical surface of the tubular handle. Centrally of the terminal block 11 and extending inwardly from the end thereof within the tubular handle 10 is a socket 12 that receives and has secured therein by a set screw 13 an end 14 of an insulated cable 15 projecting well within the tubular handle and leading from a source of electricity.

The end of the terminal block 11 opposite to that to which the cable 15 is attached is arranged substantially flush with the end of the tubular handle 10 and has a longitudinal bore 16 extending inwardly a substantial distance from the end thereof and a transversely arranged bore 17 extending at right angles to and terminating at the longitudinal bore 16. In the wall of the tubular handle 10, there is a hole 18 slightly larger than and in alignment with the bore 17. Either the bore 16 or the bore 17 and the hole 18 are adapted to receive an end of an electrode 19, as shown in Figures 1, 2, and 3, or an end of an electrode 20, as shown in Figure 4. The bores 16 and 17 are slightly larger in diameter than the largest electrode or welding rod to be accommodated therein, and both are intersected by a relatively larger bore 21 at right angles to both, engulfing portions of both, and with the cylindrical wall thereof tangent to cylindrical walls of both.

Rotatably received in the larger bore 21 is a cylindrical cam block 22 having a reduced shank 23 protruding from the center of one end thereof and having both ends rounded, as at 24, and conforming to the curvature of the inner surface of the tubular handle 10. In the cylindrical portion of the cam block 22 and in alignment with the bores 16 and 17 is a spiral camming groove 25 extending the major distance around said block with one end merging into the cylindrical surface of said block while the opposite end terminates abruptly a considerable depth into said block. The surface of the camming groove 25 is concaved transversely to approximate as near as is possible the cross sectional curvature of the largest electrode or welding rod to be used in the holder.

A slot 26 provided in the tubular handle 10 of a width equal to the diameter of the shank 23 and extending to the end of said tubular handle permits said shank to pass through the handle while permitting sliding movement of the handle relative to the remainder of the device. Adjacent the outer end of the shank 23, as shown in Figure 3, a square collar 27 is formed on said shank which is positioned in a similarly shaped recess 28 in one side of a hand knob 29, while the extreme end of said shank has a nut 30 threaded thereon that engages an end wall of another and larger recess 31 provided in the opposite side of said hand knob for rigidly supporting said hand knob on the outer end of the shank. The hand knob 29 is constructed of insulating material and is preferably rectangular in shape with the corners thereof slightly rounded for obtaining a firm and comfortable hand grip thereon.

In operation, a welding rod may be inserted in either the longitudinal bore 16 or in the transverse bore 17, and while holding the tubular handle 10 in one hand and turning the hand knob 29 in a counterclockwise direction with the other hand, the camming surface of the spiral groove 25 engages a side of the welding rod and forces the opposite side of said rod against the cylindrical wall of the bore and the end of the rod against the end of the bore. Due to the slight eccentric arrangement of the groove 25 relative to the cylindrical bearing surface of the clamping member 22, the welding rod when securely clamped in the holder binds the clamping member against accidental turning movement in a reverse direction when released. When it is desired to remove a welding rod from the holder, the hand knob 29 is turned in a clockwise direction, and as pressure is released on the rod, the direction of rotation of the clamping member slightly feeds the gripped end of the rod in an outward direction, thereby breaking contact engagement of the rod with the wall of the bore for causing the rod to drop from the holder when turned downward.

It will be observed that the tubular handle 10 is the element that retains the camming block 22 in proper assembled position in the terminal block 11 when a welding rod is not held by the holder, and that to remove the camming block from the terminal block for inspection or replacement of parts, all that is necessary is to slide the tubular handle rearwardly which disengages the same from the ends of the block 22 and permits withdrawal of said block from the bore 21 of the terminal block, as shown in Figure 5.

While an electrode holder is shown and described for engaging and holding welding rods either projecting longitudinally or transversely from the handle 10, it is to be understood that separate holders for supporting welding rods in each position relative to the handle may be constructed and used.

In view of the foregoing description taken in conjunction with the accompanying drawing, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. An electrode holder comprising an elongated tubular handle of insulating material, a terminal block slidably received in one end of said tubular handle and having a bore therein adapted to receive one end of an electrode, said terminal block also having a second bore of a larger size and cylindrical formation therein intersecting said first-mentioned bore and at right angles to said elongated tubular handle, a cylindrical clamping block rotatably received in said second-mentioned larger and cylindrical bore and supported against endwise movement by engagement of its opposite ends with said tubular handle, means for manually rotating said clamping block, said clamping block having a surface thereon adapted to engage an electrode in said first-mentioned bore and bind said electrode between same and the wall of said bore upon turning movement of said clamping block in said terminal block, and means on said terminal block adapted for attachment thereto of an electric cable extended into said tubular handle.

2. An electrode holder comprising an elongated tubular handle of insulating material having a slot therethrough extending to an end thereof, a terminal block slidably received in the slotted end of said tubular handle and having a bore therein adapted to receive one end of an electrode, said terminal block also having a second bore of a larger size therein intersecting said first-mentioned bore and at right angles to said elongated tubular handle and aligned with the slot therein, a clamping block rotatably received in said second-mentioned bore and supported against endwise movement by engagement of its opposite ends with said tubular handle, a reduced shank on said clamping block extending through the slot in said tubular handle, a knob on said shank for rotating said clamping block, said clamping block having a surface eccentric to the axis upon which said block rotates adapted to engage an electrode in said first-mentioned bore and bind said electrode between same and the wall of said bore upon turning movement of said clamping block in said terminal block, and means on said terminal block adapted for attachment thereto of an electric cable extended into said tubular handle.

3. An electrode holder constructed in accordance with claim 2 in which said knob is of insulating material and is located on the extreme outer end of the shank.

4. An electrode holder comprising an elongated tubular handle of insulating material having a slot therethrough extending to an end thereof, a terminal block slidably received in the slotted end of said tubular handle and having bores arranged therein at different angles adapted to receive one at a time one end of an electrode, said terminal block also having another bore of a larger size therein intersecting said first-mentioned bores and at right angles to said elongated tubular handle and aligned with the slot therein, a clamping block rotatably received in said second-mentioned larger bore and supported against endwise movement by engagement of its opposite ends with said tubular handle, a member secured to said clamping block and extended through the slot in the tubular handle for manually rotating said clamping block, said clamping block having a surface thereon adapted to engage an electrode in any of said first-mentioned bores and bind said electrode between same and the wall of said bore receiving said electrode upon turning movement of said clamping block in said terminal block, and means on said terminal block adapted for attachment of an electric cable extended into said tubular handle.

References Cited in the file of this patent

UNITED STATES PATENTS

| | | |
|---|---|---|
| 1,458,973 | Bufford | June 19, 1923 |
| 1,902,896 | Schabelitz | Mar. 28, 1933 |
| 1,935,449 | Inman | Nov. 14, 1933 |
| 2,213,306 | Del Bene | Sept. 3, 1940 |
| 2,383,951 | Bass | Sept. 4, 1945 |
| 2,396,307 | Waterman | Mar. 12, 1946 |
| 2,413,213 | Cardinal | Dec. 24, 1946 |